July 26, 1949.  C. F. DISSINGER  2,477,365
HAND POSITION GUIDE FOR BOWED-STRING-INSTRUMENTS
Filed Nov. 4, 1947  2 Sheets-Sheet 1
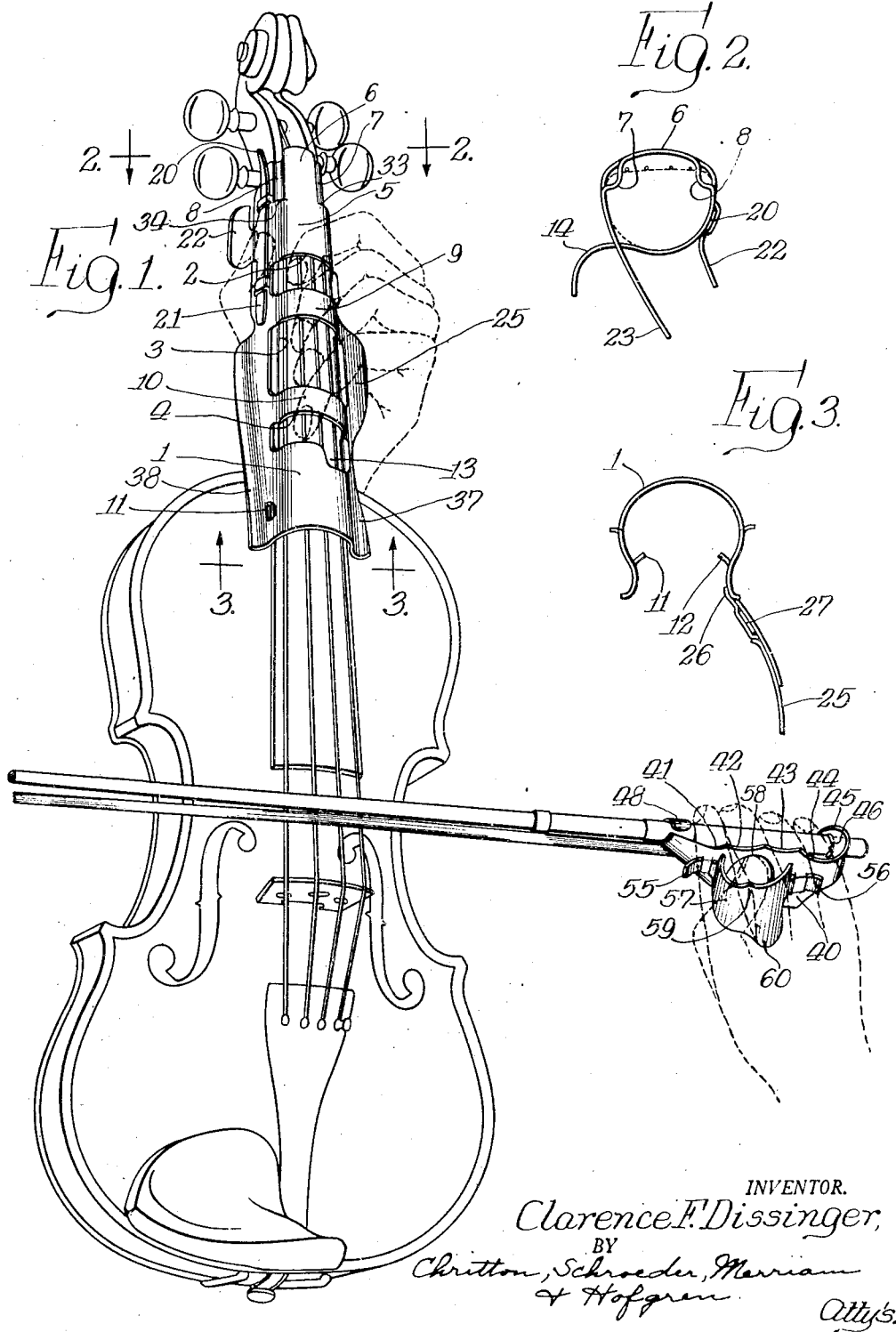
INVENTOR.
Clarence F. Dissinger,
BY
Chritton, Schroeder, Merriam
& Hofgren
Attys.

July 26, 1949.   C. F. DISSINGER   2,477,365
HAND POSITION GUIDE FOR BOWED-STRING-INSTRUMENTS
Filed Nov. 4, 1947   2 Sheets-Sheet 2
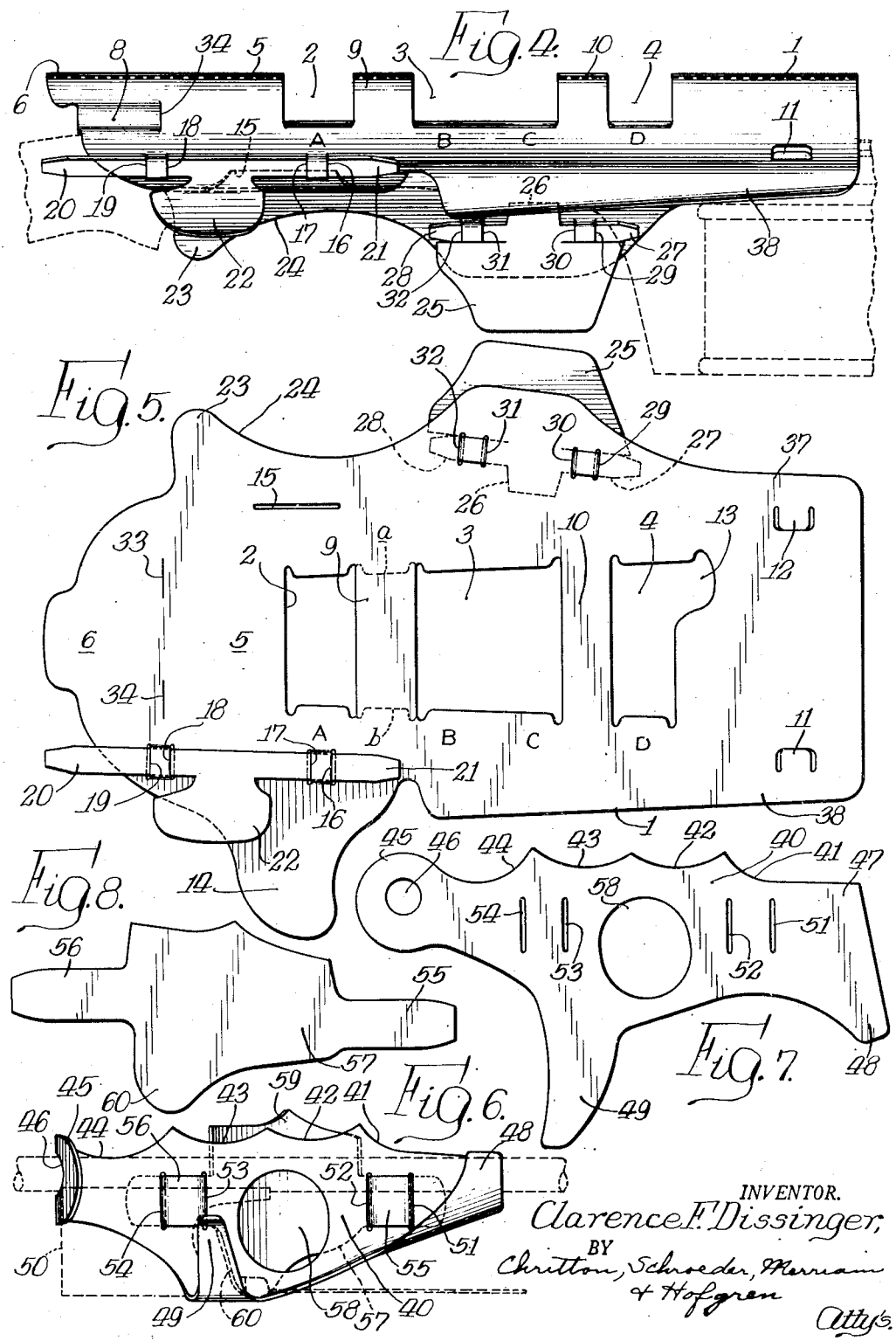

Patented July 26, 1949

2,477,365

UNITED STATES PATENT OFFICE 2,477,365

HAND POSITION GUIDE FOR BOWED-STRING-INSTRUMENTS

Clarence F. Dissinger, La Grange, Ill.

Application November 4, 1947, Serial No. 783,919

8 Claims. (Cl. 84—315)

This invention relates to a hand position guide for string instruments and more particularly to guide means for properly positioning the hand and fingers of a student when learning to play a string instrument such as a violin, viola, cello, string bass, and the like, with which a bow is drawn across the strings, or the string is plucked, to produce the sound, and which instrument is hereinafter referred to as a bowed-string-instrument.

In learning to play a bowed-string-instrument one of the greatest difficulties experienced by the student is the correct positioning of the hand and fingers on the strings for playing in tune; and the correct positioning of the hand and fingers in holding the bow. Even after having played such an instrument for a considerable length of time without proper initial instructions, most of such players acquire faults in the positioning of the hand and fingers with relation to both the strings and the bow. The hand positioning guide of the present invention overcomes the above difficulties and enables the student to learn the proper positioning of the hands and fingers for correct playing.

Among the objects of my invention are: to provide a novel and improved hand position guide for bowed-string-instruments; to provide a hand position guide to enable the correct placing of the fingers of the left hand on the strings for playing in tune; to provide a hand position guide to insure the correct position of the right hand thumb on the bow; to provide a hand position guide to insure the correct position of the right hand fingers and thumb on the bow; to provide a hand position guide having means for the correct positioning of the left hand thumb; to provide a hand position guide for the correct positioning of the left hand wrist with relation to the neck of the instrument; to provide a hand position guide formed to prevent the neck of the instrument from resting in the bottom of the crotch of the left hand between the thumb and first finger; and such further objects, advantages and capabilities inherently possessed by my invention, as will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings:

Fig. 1 is a perspective view of the front of a violin showing applied thereto a hand position guide embodying my invention and showing applied to the bow one of my hand position guides for positioning the hand and fingers on the bow.

Fig. 2 is an end view of the outer end of a hand position guide embodying my invention, and looking from the line 2—2 in Fig. 1.

Fig. 3 is a view looking toward the inner end of my hand position guide from the line 3—3 of Fig. 1.

Fig. 4 is a side elevation of my improved hand position guide looking toward the left hand side of Fig. 1.

Fig. 5 is a top plan view of the hand position guide for the instrument's strings and showing the same laid out flat before bending into position to be applied to the neck of the instrument.

Fig. 6 is a side elevation of my hand position guide for the bow and looking toward the same from the opposite side from that shown in Fig. 1.

Fig. 7 is a development of one of the parts of the hand and finger position guide for the bow prior to bending the same into final position.

Fig. 8 is a development of the other portion of the hand position guide for the bow before bending the same into final position and before attaching the same to the portion shown in Fig. 7.

In the form shown for illustrative purposes in the drawing my hand position guide assumes two forms, one shown in the upper portion of Fig. 1 for correctly positioning the fingers of the left hand for playing simple notes in tune, and the other shown in the lower right hand portion of Fig. 1 for correctly positioning the right hand and fingers with relation to the bow when drawing the bow across the strings of the instrument during playing. Referring to Fig. 1 my hand position guide comprises a body portion 1 having a plurality (preferably three) of openings 2, 3 and 4 for receiving the fingers of the player in position for correctly playing in tune. Beyond opening 2 is formed the extension 5 which projects a short distance along the rear end of the neck of the instrument and at its outermost end terminates in the further extension 6 which at each side is provided along its longitudinal edges with downwardly extending portions 7 and 8 which rest against the upper edges of the instrument neck adjacent the tuning pegs to insure that the upper surface of the body portion and associated parts will clear the strings so as not to interfere with free vibration thereof. Openings 2 and 3 are separated by a cross member 9 and openings 3 and 4 are separated by a cross member 10. If desired cross members 9 and 10 may be made adjustable longitudinally of the guide or be fixed with relation thereto. Such longitudinal adjustment would enable playing in different keys as desired.

As noted in Fig. 1 opening 3 is of sufficient length to accommodate the second and third fingers of the player, while openings 2 and 4 are preferably somewhat shorter to accommodate the first finger and little finger respectively. The inner end of the guide as shown in Figs. 1 and 5 is provided adjacent its two lateral edges with inwardly pressed ears 11 and 12 for releasably mounting the inner end of the guide upon the neck of the instrument. Opening 4 is formed along the region of the E string of the violin with an elongation 13 to accommodate the little finger with relation to the E string. To enable a better understanding of this device reference is made to Fig. 5 in which the device is shown laid out flat and looking down upon the top surface thereof, before bending it partially around the instrument neck. The left hand side of Fig. 5 will be that portion of the device which is positioned upon the outer end portion of the instrument neck while the right hand end of Fig. 5 shows that portion of the device which is positioned somewhat inwardly of the body of the instrument. The letters indicated just below the openings in Fig. 5 represent the notes indicated by contact of the first, second, third and little fingers upon the G string. In other words when the first finger is positioned upon the G string through opening 2 it will be in position to play the note A when the bow is drawn across the G string. When the second finger is positioned in the opening 3 at the outer end of said opening and in contact with the G string the note B will be played when the bow is drawn across the G string, or the string is plucked. Similarly the third and little fingers when placed one at a time in the openings 3 and 4 and pressed downwardly against the G string will play the notes C and D when the bow is drawn across the G string, or the string is plucked. Similarly, for the simple notes, when the first, second, third and little fingers are placed one at a time in the respective positions indicated above, in the openings 2, 3 and 4, but above the D string the simple notes E, F sharp, G and A will be played when a bow is drawn across the D string, or the string is plucked. Similarly, when the fingers are placed one at a time in these openings above the A string the simple notes B, C sharp, D and E will be played when the bow is drawn across the A string, or the string is plucked. Likewise when the fingers are placed one at a time in said openings above the E string, in contact with the E string, the notes F sharp, G sharp, A, B and C will be played in succession or otherwise as desired, with the last note named played with the fourth finger extended into slot 13. In this explanation it is to be understood that if all four of the fingers, or only the little finger, are placed against any one of the strings, only the D, A, E or B note will be played depending upon which string is pressed down against the finger board. Also if the first, second and third fingers, or only the third finger, are placed in any one of the positions described above, only the note C, G, D or A will be played depending upon which string is pressed against the finger board. From the above it is seen that any one of the player's four fingers may be inserted in the desired position in its respective opening in the guide and the note corresponding to that opening will be played in tune for whichever string is being pressed against the finger board.

To enable the guide to be detachably mounted upon the instrument neck there is provided in the lower left hand corner of the blank shown in Fig. 5 an extending tab or ear 14 which, when the adjacent portion of the guide is bent around the instrument neck, may be passed through the slot 15 on the opposite side to detachably hold the guide on the neck as will be better understood in Fig. 2. This tab 14 is positioned slightly inwardly of the outer end of the guide so as to be in the general region of the inner end of the player's first finger when the guide is in position on the instrument neck. Formed a slight distance inwardly of the outer end of the tab 14 are four short transverse slits 16, 17, 18 and 19 to slidably receive the ends 20 and 21 of an adjustable thumb piece 22, which thumb piece as seen in Fig. 1 will be bent laterally so as to correctly position the player's thumb with relation to the neck of the instrument. As will be understood this thumb piece is adjustable longitudinally of the guide by reason of the ability of the end extensions 20 and 21 to slide longitudinally through slots 16—19. This enables the thumb piece to be adjusted as desired for positioning the thumb of different players.

In Fig. 5 it will be noted that in the upper left hand corner of the guide when laid out flat is formed a tab or extension 23 which, when the guide is bent into position upon the instrument neck, will be seated approximately in the bottom of the crotch between the thumb and first finger of the player. The curvature 24 along the inner edge of tab 23 is such as to comfortably fit over the upper edge of the side portion of said crotch.

Viewing the guide blank as laid out flat it will be seen that there is provided on the upper edge as viewed in Fig. 5 and slightly to the right hand side thereof a wrist guide 25 which on its inner edge is formed with an offset portion 26 adapted to slidably fit against the under or inner face of the guide for steadying purposes. Also there is formed at each end of that portion of the wrist guide 25, adjacent the offset portion 26, a pair of strap-like extensions 27 and 28 which are slidably mounted through slots 29, 30, 31 and 32 formed in the body portion of the guide. This enables the wrist guide to be adjusted longitudinally with relation to the body portion of the guide. As will be seen in Figs. 4 and 5 this wrist guide 25, when the hand position guide is mounted upon the instrument neck, will contact or approximately contact the palm of the player's hand. This correctly positions the player's wrist and prevents the players from placing the palm of their hand too close to the under face of the instrument neck, which, if they would so wrongly position it, would throw their fingers in wrong positions with relation to the strings. The blank 1, adjacent its left hand end as viewed in Fig. 5, is formed with a pair of alined but spaced apart slots 33 and 34 to enable the material of the blank to be bent inwardly, as seen at 7 and 8 in Fig. 2, to hold the top face of the hand position guide away from contact with the strings of the instrument.

When positioned upon the instrument neck the longitudinal edges of the rear portion of the guide will be slightly bent outwardly to form outwardly curled edges 37 and 38 as seen in Fig. 1.

It is thus seen that I have provided a hand position guide for the correct positioning of the player's fingers upon the strings of the instrument, in such manner as to hold the wrist and hand in correct posture with relation to said neck and the fingers in position to be readily pressed against the instrument's strings to play desired notes in correct tune. Also the correct positioning of the player's hand will be further correctly determined by the contact of the thumb against the inner edge of the thumb piece 22, and the contact of the inner curvature of the edge of the tab 23 over the upper edge of the crotch between the thumb and first finger. This simultaneously correctly positions the thumb with relation to the instrument neck, and prevents the instrument neck from being positioned too far downwardly within the crotch of the player's hand between the thumb and first finger. The wrist guide 25 will prevent the player from attempting to choke the instrument neck. It is accordingly seen that this hand positioning guide will teach the player to correctly position his wrist, hand and fingers with relation to the strings of the instrument so as to correctly play the simple notes in tune. As stated above should it be desired to use this device when playing in certain keys requiring the same, the cross pieces 9 and 10 (Fig. 1) may be made adjustable longitudinally of the guide to enable such change in key. For example dotted lines $a$ and $b$ in Fig. 5 show that the cross piece 9 may be detachable or that it may be removed and placed in a different position for a different key, or moved longitudinally by any suitable connections as desired.

I have likewise provided a hand positioning guide for the right hand of the player to correctly position the same with relation to the bow. This form of the device is shown in the lower right hand portion of Fig. 1 and in Figs. 6, 7 and 8. This form of the invention comprises a body portion 40 which is shown laid out flat in Fig. 7 and comprises in its upper edge indentations 41, 42, 43 and 44 for reception of the first, second, third and fourth fingers of the right hand against the top edge of the bow. Body portion 40 is also formed at its left hand end as viewed in Fig. 7 (which would be the rear end portion of the bow) with an ear 45 adapted to be bent at approximately right angles as shown in Fig. 6. Ear 45 is formed with an opening 46 through which the rear end of the bow will be inserted. The right hand end of the body portion as viewed in Fig. 7 is provided with an upper corner 47 and a lower projection 48, which parts will be curved laterally of the bow so as to position the same detachably upon the bow when the bow end is inserted through opening 46 in the opposite end, which will be better understood in Fig. 6. Body portion 40 will also be provided at its lower edge as viewed in Fig. 7 with a projection 49, somewhat longer than the projection 48, so that projection 49 may be bent around under the bottom edge of the tightening head 50 of the bow and passed part way upwardly behind the same as seen in Fig. 6. Body portion 40 is also provided with four transverse slits 51, 52, 53 and 54 extending in a transverse direction so as to slidably receive therein the projecting tongues 55 and 56 of the thumb positioning member 57, which is separately shown in Fig. 8. This provides adjustment for various finger lengths and thumb sizes. Body portion 40 is also provided near its central portion with an enlarged opening 58 which is positioned behind the outwardly bowed portion 59 of the member 57 when the latter is positioned with its tongues 55 and 56 in slots 51—54. As will be understood in Fig. 1 this portion 59 is bent outwardly of the body portion 40 a sufficient distance to permit the player's thumb to be inserted between the parts 57 and 40 with the end of his thumb passing through opening 58 to bear slightly against the lower edge of the bow. It is also important to note that the portion 57 is formed at its lower edge slightly to the left as viewed in Fig. 8 with an extension 60 which, when part 57 is placed in outwardly curved position with relation to body portion 40, will hold the thumb in proper position with relation to the guide and the bow. In using the hand positioning guide for the right hand in grasping the bow the first finger will be placed in indentation 41, the second finger in indentation 42, the third finger in indentation 43 and the little finger in indentation 44, and the thumb passed upwardly behind the outwardly curved portion 59 and through opening 58 with the end of the thumb slightly pressing against the under edge of the bow. This will correctly position the right hand and right fingers with relation to the bow, so that the student in learning will acquire a correct positioning of his right hand and fingers on the bow. This will be better understood in Fig. 1.

From the above it will be understood that I have provided a detachable hand position guide upon the instrument neck for the correct positioning of the wrist, hand and fingers when fingering the strings, and a hand positioning guide for the right hand which is detachable with relation to the bow and will position the right hand and fingers correctly with relation to the bow when drawing the same over the strings during playing. While, for illustrative purposes, I have shown in the drawings and described above the present invention as applied to a violin, it is to be understood that the same may also be used upon other forms of bowed-stringed-instruments to which it is adaptable.

Having described my invention, I claim:

1. A hand position guide for teaching players of bowed string instruments to properly handle the bow, comprising, a body portion having means for detachably securing the guide to the rear end portion of the shaft of a bow, said body portion having an opening through its side wall for receiving the player's thumb, and a curved member secured to said body portion in spaced relation over said opening so that the player's fingers may be positioned over the top edge of the guide and outside of said curved member to contact the top edge of the bow shaft, and the thumb may be passed under the curved member and part way through said opening so that the end of the thumb may contact the under side of the bow shaft.

2. A hand position guide as claimed in claim 1, in which the top edge of the body portion is formed with finger receiving depressions, said body portion having on its lower edge a bendable projection adapted to be bent around the lower edge of the tightening head of the bow and partway upwardly behind the same.

3. A hand position guide as claimed in claim 1, in which the top edge of the body portion is formed with finger receiving depressions, and the bottom edge of the curved member is formed with a projection to flex the thumb outwardly when it is introduced under the curved member and in said opening.

4. A hand position guide as claimed in claim 1, in which the body portion and the curved member are each formed of semi-flexible sheet material, and the curved member is detachably connected to the body portion.

5. A hand position guide for teaching players of bowed string instruments to properly position their fingers upon the bow when playing, comprising, a body portion having an opening in one face, a curved member secured at its ends to said body portion and having its intermediate portion spaced outwardly away from the body portion in front of said opening.

6. A hand position guide as claimed in claim 5 in which the body portion is formed adjacent each of the opposite longitudinal sides of said opening with a pair of slits and the curved member is formed at each end with a tongue slidably engaging a pair of said slits.

7. A hand position guide for teaching players of bowed string instruments to properly position their thumb and fingers on the bow, comprising a pair of flexible members adjustably and detachably secured together, one of said members being curved away from the other one to form a space therebetween for reception of the player's thumb, said members being adapted to be detachably mounted on the rear end of the bow.

8. A hand position guide as claimed in claim 7, in which the member other than the curved one is formed with a thumb opening positioned behind the curved portion of the curved member.

CLARENCE F. DISSINGER.

REFERENCES CITED

The following references are of record in the file of this patent:

UNITED STATES PATENTS

| Number | Name | Date |
| --- | --- | --- |
| 248,467 | Hunt | Oct. 18, 1881 |
| 384,045 | Latchmore | June 5, 1888 |
| 643,125 | Gunkel | Feb. 13, 1900 |
| 663,187 | Ropp | Dec. 4, 1900 |
| 1,394,407 | Charniwsky | Oct. 18, 1921 |
| 1,435,926 | Johnson | Nov. 21, 1922 |
| 1,775,472 | Ostrovski | Sept. 9, 1930 |
| 1,897,225 | Archer | Feb. 14, 1933 |